L. Magers,
Making Shot.
Nº 1,855          Patented Nov. 13, 1840.
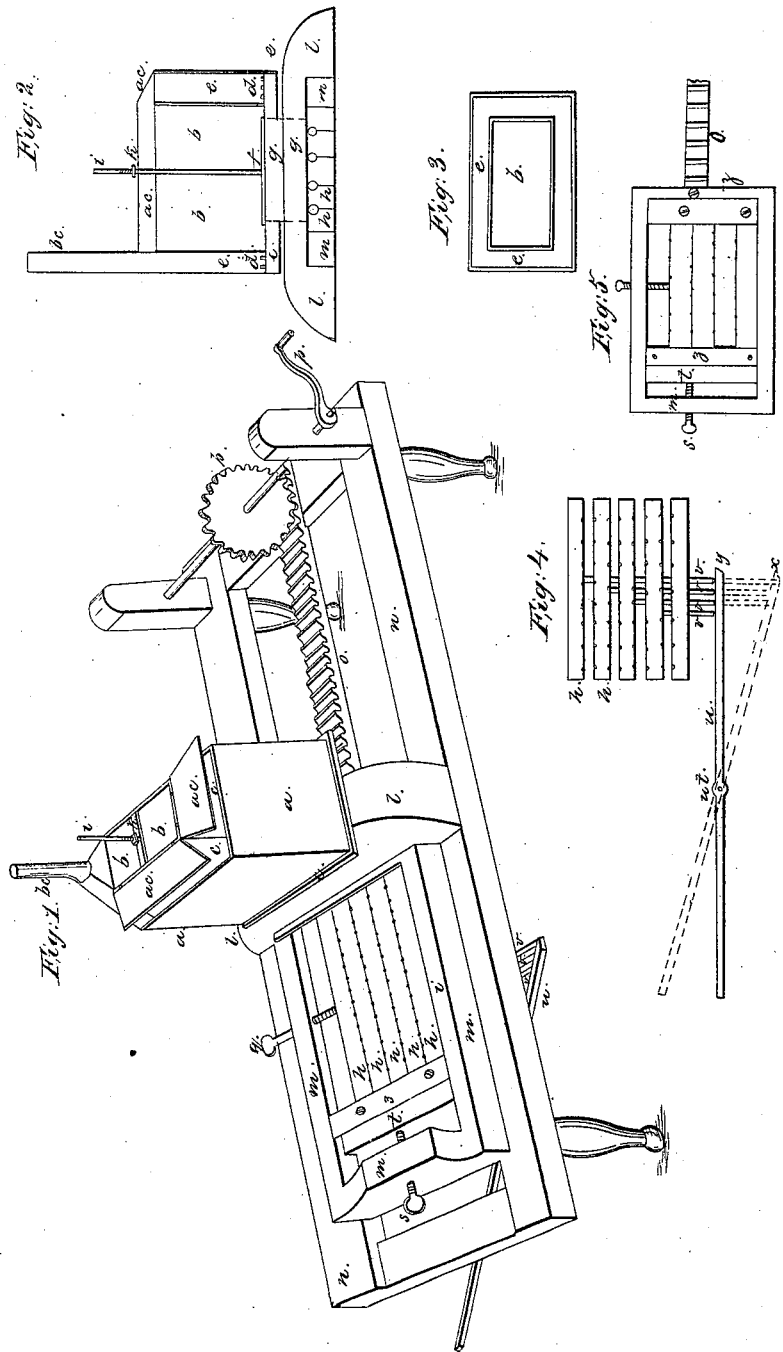

UNITED STATES PATENT OFFICE.

LEVI MAGERS, OF BALTIMORE, MARYLAND.

IMPROVEMENT IN THE MACHINE FOR MANUFACTURING BALLS OR SHOT.

Specification forming part of Letters Patent No. 1,855, dated November 13, 1840.

*To all whom it may concern:*

Be it known that I, LEVI MAGERS, of the city of Baltimore and State of Maryland, have invented a new and useful Improvement in the Method of Manufacturing Balls or Shot; and I do hereby declare that the following specification, with the accompanying drawings, is a full and exact description.

The principle consists in the combination of a melting-furnace and a gang of molds.

$a\ a$, Figure 1, is the furnace with a kettle in the middle, as $b\ b$, Fig. 1. The furnace stands on an iron arch, $l\ l$, and this arch stands on the frame $n\ n$.

$b\ b$, Fig. 2, is a side view of the kettle, and $b$, Fig. 3, is a downward view surrounded by the furnace $c\ c\ c$, and $c\ c$, Fig. 1, and $c\ c$, Fig. 2.

$a\ c$ and $a\ c$, Fig. 1, are trap-doors (now partly raised) of the furnace, through which fuel is introduced, as also $a\ c\ a\ c$, Fig. 2. These doors hang by hinges on the top of the kettle $b\ b$, Fig. 1.

$b\ c$ and $b\ c$, Figs. 1 and 2, is the chimney of the furnace.

$d\ d$, Fig. 2, shows a grate extending all round the kettle, and $e\ e$, Figs. 1 and 2, is an ash pan or pit, between which and the grates the air enters the furnace.

In the bottom of the kettle there is a gate or valve, as $f$, Fig. 2, to let the melted lead pass through the throat $g\ g$, Fig. 2, the sides of which throat are represented by the dotted lines passing down through the ash-pit $e\ e$ and through the arch $l\ l$ of Figs. 1 and 2, to the molds $m\ m$, &c., Fig. 2, and $h\ h$, &c., Fig. 1. This gate may be regulated or raised by a screw, $k$, on the stem $i$ in Figs. 1 and 2, the nut resting on a cross-piece, also marked $k$, on the kettle; or the valve may be raised and lowered by means of a rack on the stem, and worked by means of a pinion and winch. The gate is opened or raised and lowered at each supply or filling of the molds. It will be seen that under the bench or arch $l\ l$ and under the throat of the kettle passes the gang of molds $h\ h$, &c., Figs. 1, 2, and 4. This gang of molds are adjusted in a frame or carriage, $m\ m$, Fig. 1, which carriage rides on the frame $n\ n$ of the machine and passes under the arch $l\ l$.

$m\ m$, Fig. 2, represents an end view of the two sides of the carriage and molds. To the inner end of the carriage containing the molds is attached a rack, $o$, Fig. 1, which is moved back and forward by the pinion and winch $p\ p$. Two casts may be made at each action and reaction of the rack and carriage.

$q$, Fig. 1, is a thumb-screw passing through one side piece of the carriage to press the molds up against each other and against the side piece, $r$, to close them snugly. $s$ is also a thumb-screw passing through the end piece of the carriage, to press the piece $t$ up against the ends of the molds to keep them in place. There is under the arch $l\ l$ a head-piece of the carriage and another piece, as 3, Fig. 1, corresponding with $m$ and 3, Fig. 1, so that by means of these screws the molds are kept in place. These screws are slackened at each discharge of the molds before the lever is moved to open the molds.

$u$, Figs. 1 and 4, shows a lever supported by a bolt, $u\ t$, on the under side of the frame $n\ n$, Fig. 1.

The dotted lines, Fig. 4, show the position of the lever when the molds are closed, as at Fig. 1, and the lines show the position of the lever and molds when opened. Each piece of the molds has a stem, as $v\ v$, &c., Figs. 1 and 4, which, by being of different lengths, the lever, in moving from $x$ to $y$, opens the molds, as now represented at Fig. 4. This lever may be moved by hand or geared to move by the action of the carriage. The molds, as already stated, are closed by means of the screw $q$.

In constructing the molds it is essential that the openings which form the necks of the balls or shot should come so near the upper part of the metal forming the balls that there shall be no neck to the ball. It will be necessary that the molds slide snug up under the bench or arch and throat, so that there shall be no leak or waste of the fluid metal as the molds pass and repass the throat.

In Fig. 2, $g\ g$ show the throat and $m\ m$ an end view of the molds as the necks or openings are subjected to the melted lead. The molds may be of any length and number required, so as to contain any required size and number of shot.

I trust there will remain no difficulty in understanding the principle of the furnace and kettle I adopt when I merely place a kettle so as to surround it on all sides (except the top) by a furnace, the furnace opening on two or more sides, as seen by the doors *a c* and *a c*, Figs. 1 and 2, the kettle having a neck or throat passing down through the ash-pit to the molds, the bottom of the kettle having a valve or gate to rise and fall to let the melted lead into the throat, of course the throat being always full of melted lead, and when the carriage is moved so that the piece or plate 3, Fig. 1, or a similar plate at the other end of the molds now under the arch comes under the throat the bottom of the throat is closed and the melted metal cannot descend. The plate 3 and the corresponding one at the other end of the molds are permanently set on the carriage, and the molds slide laterally under it. This plate is designed to keep the molds down in place.

Fig. 5 represents a downward view of the carriage as it contains the molds.

3 3 are the pieces under which the molds slide laterally. These pieces 3 3 shut the throat when the molds are at either end of the stroke of the carriage, and the molds not under the throat.

The letters *q*, *s*, *t*, and *m* agree with the same letters in Fig. 1.

What I claim as my invention, and desire to secure by Letters Patent, is—

The combination of the furnace and kettle with the molds, as herein described, and also the combination and arrangement of the molds with the carriage in the manner described.

LEVI MAGERS.

Witnesses:
JOHN W. POST,
WM. DUKEHART.